UNITED STATES PATENT OFFICE.

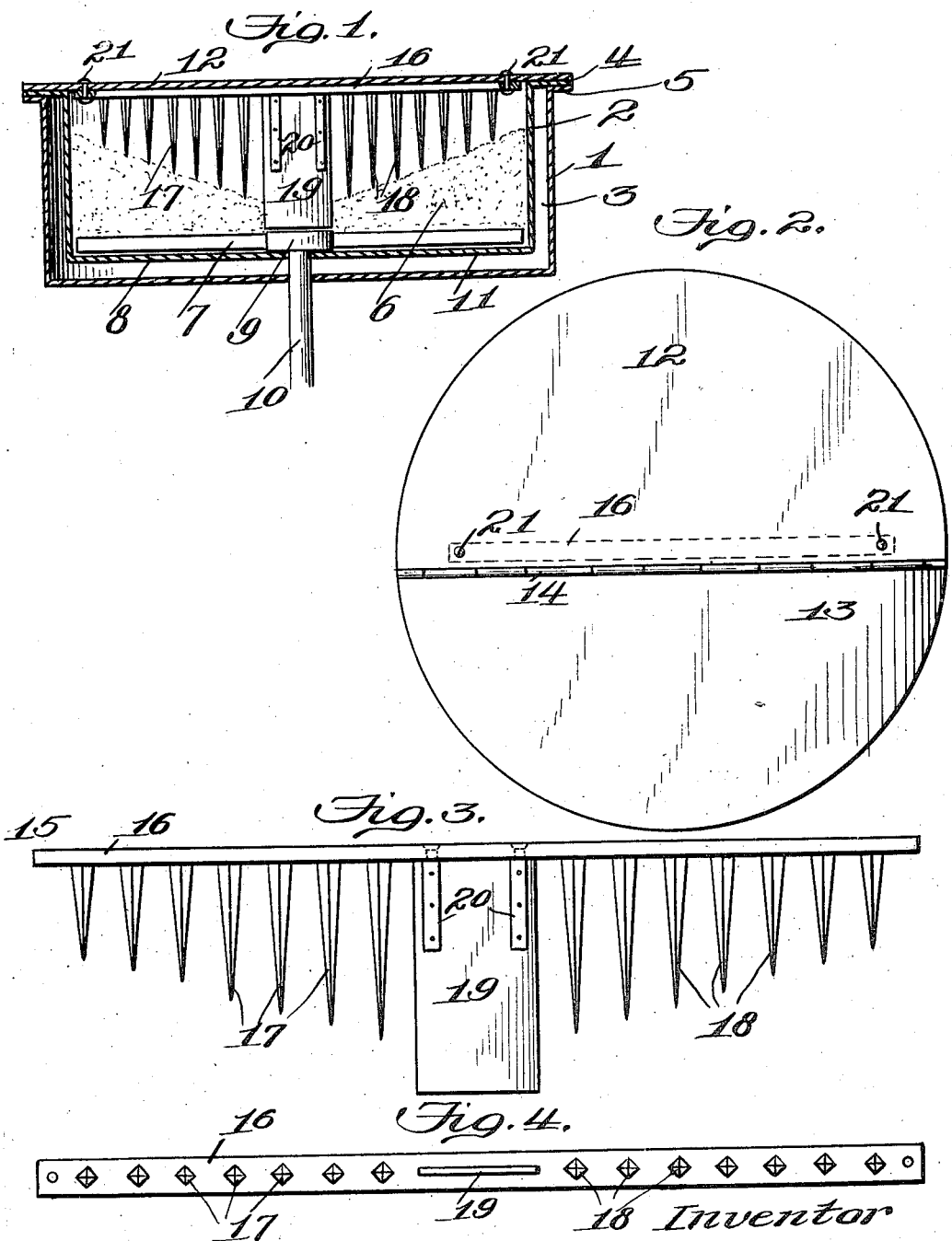

JOHN L. CUNNINGHAM, JR., OF NEW ORLEANS, LOUISIANA, ASSIGNOR OF ONE-HALF TO CORNALIUS DRISCOLL, OF NEW ORLEANS, LOUISIANA.

COTTON-SEED-MEAL COOKER.

No. 903,129.　　　　Specification of Letters Patent.　　　　Patented Nov. 3, 1908.

Application filed May 11, 1908. Serial No. 432,246.

*To all whom it may concern:*

Be it known that I, JOHN L. CUNNINGHAM, Jr., a citizen of the United States of America, residing at Algiers, New Orleans, Louisiana, have invented certain new and useful Improvements in Cotton-Seed-Meal Cookers, of which the following is a specification.

This invention relates to cotton seed meal cookers and the object thereof is to provide a cooker with means as hereinafter set forth whereby the formation of water balls will be prevented as well as the breaking up of raw lumps of meal also obtained during the cooking of the meal.

With the foregoing and other objects in view, the invention consists of the novel construction, combination and arrangement of parts hereinafter more specifically described and illustrated in the accompanying drawings wherein is shown the preferred embodiment of the invention to obtain the functions referred to, but it is understood that changes, variations and modifications can be resorted to which come within the scope of the claims hereunto appended.

In the drawings wherein like reference characters denote corresponding parts throughout the several views:—Figure 1 is a cross section of a cotton seed meal steam cooker showing the adaptation therewith of a comb in accordance with this invention for breaking water balls and raw lumps during the cooking of the meal. Fig. 2 is a top plan view of the steam cooker. Fig. 3 is an elevation of the comb, and Fig. 4 is an inverted plan of the comb.

Referring to the drawings by reference characters 1 denotes an outer casing and 2 an inner casing. The diameter of the inner casing 2 with respect to the outer casing is such as to provide a steam space 3. The inner casing 2 is supported within the outer casing 1 through the medium of a laterally extending annular flange 4 which is seated upon a laterally extending annular flange 5 formed integral with the outer casing 1. The flange 4 not only constitutes a support for the inner casing 2, but further constitutes the top wall of the steam space 3. The height of the casing 2 with respect to the casing 1 is such that the steam space 3 will be formed around the side and below the bottom of the said casing 2. The casing 2 forms a receptacle for the reception of the meal 6 to be cooked and arranged within said casing 2 is a plurality of agitator arms 7 which are positioned in close proximity to the bottom 8 of the casing 2 and are connected to a hub 9 arranged within said casing 2 and secured to one end of a rotatable member 10 which not only extends in the casing 2 but also through the steam space 3 and through the bottom 11 of the outer casing 1. The rotatable member 10 is connected to a suitable operating means therefor, not shown. A sectional cover is provided for the inner casing 2. The sections of the cover are indicated by the reference characters 12 and 13. The section 12 is fixed to the flange 4 and the section 13 is hinged as at 14 to the section 12. The section 13 is disconnected from the flange 4 so that said section 13 can be raised when occasion so requires and access be had to the interior of the casing 2.

Arranged within the inner casing 2 and depending therein is a comb, referred to generally by the reference character 15. The comb 15 comprises an elongated strip of suitable material 16 which constitutes the body portion and has depending therefrom two series of tines indicated respectively by the reference characters 17 and 18. The tines of each series gradually increase in length inwardly and each series of tines is separated by a depending flat rectangular arm 19 which is connected with the body portion 16 by the hangers 20. The tines of each series of tines gradually taper towards the lower end. The comb 15 is constructed of any suitable metallic material whereby longevity and durability is obtained.

The body portion 16 of the comb 15 is fixedly secured to the inner face of the section 12 through the medium of the hold-fast devices 21 extending through the said body portion 16 and the section 12. The body portion 16 is of less length than the diameter of the inner casing and is positioned in close proximity to the hinge 14, the position of the comb being approximately centrally of the inner casing 2 in view of the fact that the section 12 is larger than the section 13.

The agitator arm when rotated agitates the meal within the section 2, causing the mass to contact with the comb, the tines of the comb under such conditions breaking up the raw lumps and also preventing the formation of water balls, as will be evident.

The rectangular arm 19 constitutes a scraper and is adapted to prevent the meal from accumulating upon the upper face of the hub 9, as the length of the arm 19 is such as to readily scrape the meal off the hub.

A suitable inlet and outlet not shown is provided for the steam space 13.

What I claim is:—

1. In a cotton seed meal cooker, an inner and an outer casing, said inner casing surrounded by a steam space, a sectional cover for the inner casing, one of the sections being fixed, agitating means at the bottom of the inner casing, and a comb secured to the inner face of the fixed section and having two series of tines gradually increasing in length towards the center of the comb and individually tapering towards their lower ends, the comb at the center having a flat scraper between the two series of tines and projecting below the tines of maximum length adjacent thereto.

2. In cotton seed meal cookers, a receptacle for the meal, agitating means in the bottom of the receptacle, a cover therefor, and a stationary comb arranged within the receptacle and having two series of tines gradually increasing in length towards the center of the comb, the comb being also provided with a central scraper depending therefrom between the two series of tines and of greater length than the tines of maximum length to prevent the meal from packing at the center of the receptacle.

3. In a cotton seed meal cooker, a receptacle for the meal, agitating means in the bottom of the receptacle, a cover therefor, and a stationary comb arranged within the receptacle and having tines depending therefrom and a central scraper between the tines, the scraper being of greater length than the tines.

4. In a cotton seed meal cooker, a receptacle for the meal, a plurality of agitators in the bottom of the receptacle, projecting from a rotatable hub, and a stationary comb arranged in the receptacle above the agitators and provided with a series of tines and a central scraper depending below the tines to clear the hub of meal.

5. In a cotton seed meal cooker, a receptacle for the meal, movable agitating means in the bottom of the receptacle, and a stationary comb arranged within the receptacle and over the agitating means and having a plurality of depending tines and a central scraper extending below the tines over the center of the agitating means to clear the meal from the said center of the agitating means.

In testimony whereof I have hereunto set my hand in presence of two subscribing witnesses.

JOHN L. CUNNINGHAM, Jr.

Witnesses:
W. H. COOK,
EDWARD CUNNINGHAM.